US008334877B2

(12) United States Patent
Saed

(10) Patent No.: US 8,334,877 B2
(45) Date of Patent: *Dec. 18, 2012

(54) DIGITAL COMPOSITION OF A MOSAIC MOTION PICTURE

(76) Inventor: Aryan Saed, Ottawa (CA)

( * ) Notice: Subject to any disclaimer, the term of this patent is extended or adjusted under 35 U.S.C. 154(b) by 1136 days.

This patent is subject to a terminal disclaimer.

(21) Appl. No.: 10/951,663

(22) Filed: Sep. 29, 2004

(65) Prior Publication Data

US 2005/0100319 A1    May 12, 2005

(30) Foreign Application Priority Data

Oct. 1, 2003  (CA) .................................... 2443286

(51) Int. Cl.
*G09G 5/00* (2006.01)
(52) U.S. Cl. ......... 345/619; 345/629; 382/282; 382/284
(58) Field of Classification Search ............ 345/473
See application file for complete search history.

(56) References Cited

U.S. PATENT DOCUMENTS 6,137,498 A * 10/2000 Silvers .......................... 345/629
6,611,268 B1 * 8/2003 Szeliski et al. ................ 345/473

OTHER PUBLICATIONS

Steve Martin "Video Mosaics" www.cs.berkeley.edu/~steveø/cs294 final.
Allison W. Klein "Video Mosaics" NPAR 2002 Second International Symposium on Non-PhotoRealistic Rendering pp. 21-28 Jun. 2002, *Available at* www.cs.princeton.edu/gfx/pubs/klein_2002_VM/index.php.

* cited by examiner

*Primary Examiner* — Kee M Tung
*Assistant Examiner* — Jwalant Amin

(57) ABSTRACT

A mosaic movie resembling a target movie is composed of movies from a data base. The target movie is divided into tile regions of a specified size and shape, and the individual movies from the data base are compared to each region to find the best matching tile. The comparison is performed by calculating a figure of visual difference between each tile and each region. The data base of tile images is created from raw source movie using digital image processing, whereby multiple instances of each individual raw source movie are produced. Tile matching is performed such that all raw source movies are represented in the final mosaic. The digital image processing involves the adjustment of colour, brightness and contrast of tile movies, as well as cropping. A movie description index locates each movie in the final mosaic.

33 Claims, 9 Drawing Sheets decimation of raw source movies

Generation of target tile region movies figure of difference
based on zero frame offset figure of difference
based on offset of 1 frame crop tracking for
image stabilization

DIGITAL COMPOSITION OF A MOSAIC MOTION PICTURE

FIELD OF INVENTION

The present invention relates generally to the computerized composition of mosaic movies from a plurality of source movies. More specifically, the composed mosaic movie resembles a target movie, whereby the target movie and the source movies are typically based on cinematographic recordings (video or movie recordings) or animations (animated video). The composition of a mosaic movie from a plurality of other movies is a well known method to create artistically pleasing effects.

BACKGROUND—DISCUSSION OF PRIOR ART

The field of mosaic movies resembles the well known field of mosaic images.

Mosaic images are photograph based mosaics and they are well known and popular in the field of graphic design and graphic art. Whereas traditionally mosaic images were manually composed by artists, such mosaic collages are now generally composed using digital search and matching techniques with specialised computer software. With such software it is possible to create mosaics containing hundreds and even thousands of images by automatically selecting images from thousands of raw source images in a digital image library. These library images are typically digital still pictures (photographs) or digital snapshots from motion video.

U.S. Pat. No. 6,137,498 to Silvers describes a computerized method to compare regions of a digital target image with digital images from a data base. Specifically the method describes how for each tile of a target image, the best matching image in a specified data base of source images is found.

Canadian patent application 2,442,603 by Saèd describes a computerized method to compare regions of a digital target image with digital images from a data base. Specifically the method describes how for each image in a specified data base of tile images the best matching tile region is found within the target image. In a further refinement step, the tile images are modified using digital image processing techniques such as adjustment of brightness, contrast, colour and cropping to improve the resemblance between the tile and the region, thus improving the overall resemblance of the mosaic with the underlying target image.

The above two works of prior art are focused on the computer generation of still image mosaics based on still images. In a particular embodiment still images may be obtained from video, in which case all or some of the still images are frames from motion pictures.

It is also possible to generate a mosaic that resembles a motion picture (a video clip) and that is composed of a tiled arrangement of other motion pictures (a mosaic of video clips). The result is a mosaic that resembles a target movie, whereby the mosaic is composed of a regular array of tiles of video clips.

Consider the following example to illustrate an application. A television commercial for a particular product of a company contains a video clip that is a motion mosaic. The commercial commences with the motion mosaic and accompanying music with a voice-over to attract the viewer's attention. The motion mosaic consists of a mosaic of 15 tiles vertically versus 20 tiles horizontally, and all tiles are square and of equal size. At a normal viewing distance from the screen, the mosaic is a video clip of the company's product for which the commercial is produced. Of course, based on the general characteristic of a mosaics, the mosaic effect is based on resemblance with an image or movie when viewed from a distance. The video clip that is a mosaic movie appears as a grainy movie about the product. The granularity is due to the underlying tiled arrangement of video clips. These video clips, in this example, would depict various uses of the product. The video clip in each tile is chosen such that it provides the necessary colour, contrast, brightness and motion based on the colour, contrast, brightness and motion in the tile area that it covers. When the commercial zooms on to the centre of the mosaic, it quickly becomes clear to the viewer that the perceived granularity of the clip is indeed a result of the mosaic effect. The viewer begins to recognize that the tiles of the mosaic are actually small square videos, depicting various uses of the product. At an ultimate zoom level, a single tile fills the entire screen and it is now obviously a video clip on its own, depicting a popular use of the product. Then the commercial zooms out, and as more surrounding video tiles become visible again, the viewer is reminded how the focused video clip is a video tile in a mosaic movie. When the screen is again filled with the 15 by 20 square video tiles, the grainy mosaic movie about the product dominates the viewer's visual impression.

This field of invention is not to be confused with a particular area of video graphics, denoted video mosaics, whereby a still image is generated by placing snapshots (video frames) from a particular video side by side on a composite image. This is particularly popular in sports events (e.g. track and field competitions) broadcast on television. As an athlete performs the critical part of their actions, for instance a jump over a high bar, that action is recorded on video. Subsequent to showing a video replay of the action, a still shot of the athlete is shown as they negotiate their body over the high bar. But then the athlete is shown not only in one frozen position over the bar, but at multiple frozen position, for instance one frozen shot as they approach the bar, one frozen shot as they bend their body over the bar, and so forth. These frozen shots may be displayed in smaller tiled frames on the screen, starting with the first shot displayed in the top left tile of the screen and ending with the last shot displayed in the bottom right tile.

The area of video graphics is thus different from the area of the present invention. In order to aid in the separation of fields in this description, the field of the present invention shall be denoted the field of motion mosaic rather than the field of video mosaics. However, prior art in both fields use the term video mosaic.

In publication "Video Mosaics" by Allison W. Klein e.a., published in NPAR 2002 (Second International Symposium on Non Photorealistic Rendering, pp. 21-28, June 2002), the authors present a method for creating a motion mosaic. An important and complex step in the generation of the motion mosaic consists of searching a data base of source tile videos to find the best match for representing a particular video tile region of the target image. The publication presents a method for determining the visual similarity between a particular source tile movie and a tile region movie based on a wavelet transform. That is, in order to select one source tile movie over another, the movies are not compared based on coloured pixels, but rather they are each first transformed into a different mathematical representation, and they are compared based on their features within that representation. The publication further presents a dynamic programming method that finds the best matching source tile video in a library of source tile videos for a particular tile region video of the target mosaic. The publication further presents a colour correction method that improves the similarity between the mosaic movie and the target video as a final step after the matching has been completed.

On web site "Video Mosaics" by Steve L. Martin, Charles Fowlkes and Alexander Berg at U.C. Berkeley, dated Fall 2003, the authors present a method for creating a motion mosaic based on thousands of video clips. Each source tile video is described by an average colour, a colour histogram, edge histograms and energy histograms, and these description are used to find the best matching source tile video in a library of source tile videos for a particular tile region video of the target mosaic. It is further suggested that the video tiles be able to move (to shift around) to maintain a good matching mosaic while the tile movies are playing.

Other approaches to movie mosaics are also known, whereby the mosaic movie is generated frame by frame, and each frame is a still image mosaic based on still images. In this particular approach, an individual tile in a target movie is not approximated by a tile movie, but rather by a sequence of still tile images.

A limitation of the methods by Klein and Martin lies in the required number of source tile movies. To obtain an optically and artistically pleasing end result, a data base containing thousands or ten thousands of individual tile movies (video clips) is required. A large data base is desirable since it would ensure to some degree that video clips covering a broad visual range of colour and brightness transitions are provided. A broad visual range would entail, for instance, video clips transitioning from very dark to very light, and video clips ranging transitioning from having a dark area against a light background to having a light area against a dark background. Video data bases containing large number of video clips are available commercially, and the larger the data base, the better the final outcome. It is beneficial to invent a method for composing pleasing movie mosaics from smaller data bases. Smaller sized private data bases consist for instance of private video clips, such as segments of home video, By using the prior art, such a data base may yield a less than pleasing movie mosaic due to the limitations imposed by the size of the data base and the resulting limited visual range of the video clips. For instance, the smaller data base may not contain sufficient variety of dark clips, or dark clips transitioning to light. As a result, a movie that is considered the best match for a particular region in the mosaic in comparison to all other clips in the data base, may actually turn out not to produce a visually pleasing match. It is then merely the best option, but still not good enough.

A second limitation lies in the matching method. The described method is tailored for large data bases. For each tile of the target movie, the described matching method finds the best tile movie in the data base. Hence, the method cannot guarantee the insertion of specific or all video clips of the data base. Not only is this a result of the matching method itself (the methods of the prior art find the best clip or the best segment of the best clip), it is also a side effect of the underlying desire to use large data bases. Clearly, if a data base contains thousands of video clips, as desired, a mosaic composed of hundreds of tiles can impossibly contain all the video clips in that data base. It is hence beneficial to invent a matching method that enables the placement of select or all video clips (in part or in whole) of a data base, resulting in a mosaic that better represents the video clips in a data base. For instance, if a mosaic is to be composed using a data base of home video clips taken at a private event (for instance a wedding), and if all participants at the event (for instance friends and family) were recorded in one or more video clips in the data base, it is beneficial if all participants are represented in the mosaic movie. In the case of a wedding, a video clip of the wedding couple cutting the wedding cake could be used as the target movie, and the video clips for the tile movies are recorded during the festive and formal activities throughout the day.

The present invention distinguishes the prior art in that it uses a finite sized library of source videos and ensures that each source video is included in the mosaic representation of the master or target movie. The significance of this may be best described by way of the following example.

At a wedding one or more videographers, professional or amateur, takes a number of videos of the bride and groom and all of the guests in attendance. These videos are then digitized, if necessary, and stored as source videos in a video clip library. One of the videos of the bride and groom might be selected as the target or master videos and a movie mosaic representation thereof is prepared in which each and every one of the source videos is incorporated. As an alternative the mosaic representation might be composed of videos of just the bride's family or just the groom's family. The important distinction over the prior art is that in the present invention a source video is selected and a place in the mosaic is found for it. In contrast, the prior art selects a region in the mosaic and finds a source videos from a very large library to best match the region. There is no attempt to place in the mosaic all source videos in the library.

A third limitation lies in the shortcomings of the cropping method. In prior art, the set of tile movies is generated from raw video clips by cropping each raw video clip to a square or rectangle of specified size. In prior art the purpose of cropping is to produce video clips of a desired shape regardless the shape of the underlying raw source video. For instance, this allows an entire data base consisting of video clips with a variety of aspect ratios (for instance one or multiple of the following: square, 3:4 and 9:16 rectangles) to be used for tile movies of any aspect ratio. For simplicity and to enable automation, each crop is performed from centre to ensure that the centered subject matter of a tile (typically an object, a person etc.) appears in the crop and is not cut out.

When the data base is of limited size, it is beneficial to produce multiple different crops based on a given aspect ratio, and to let a matching method determine which crop is best suitable to be applied to a source video clip for a given region in the final mosaic. Moreover, it is beneficial to adaptively adjust the crop (typically by adjusting size and location, but maintaining shape) throughout the duration of the video clip based on optimum resemblance with a given tile region of the target movie.

SUMMARY

The present invention presents a cropping method that improves the resemblance of a mosaic movie mosaic to its target movie. Furthermore, the present invention presents a source image brightness, contrast and colour adjustment method that improves the resemblance of the mosaic to the target movie. These advantages are specifically pronounced if a smaller set of source images is used.

Furthermore, the present invention presents a new matching method that improves control over the representation of source movies in the final mosaic movie, particularly enabling the mandatory placement of a substantial portion all available tile movies.

Furthermore, the present invention presents an indexing method that allows the creation of an index similar to that of a geographical map. The index allows a viewer of a mosaic to quickly locate one or more occurrences of a specific source movie in the mosaic. These advantages are particularly beneficial if the mosaic is composed of private video clips from a private event.

Therefore in accordance with a first aspect of the invention there is provided a method of generating a mosaic representation of a target movie, the mosaic representation incorporating a plurality of source movies, comprising the steps of: loading the target movie into a computer; generating a database having a library of source movies; dividing the target movie into multiple tile regions; selecting source movies from the library; searching through the multiple tile regions to locate tile regions having a high visual similarity when compared with the selected source movies; positioning the source movies in the located regions; and repeating the search and positioning steps until the mosaic representation is complete.

In accordance with a second aspect of the invention there is provided a method of generating a subject matter index for source movies used in a mosaic representation of a master movie, the source movies being positioned in tile regions of the mosaic representation based on visual similarity compared with corresponding regions of the target movie, the method comprising the steps of: dividing the target movie into multiple tile regions; assigning a co-ordinate to the location of each tile region; providing a title for the subject matter of each source movie; and preparing a list of co-ordinates for each title.

In accordance with a further aspect of the invention there is provided an article displaying a mosaic representation of a target movie, the mosaic representation incorporating a plurality of source movies, the mosaic representation composed by a process comprising the steps of: loading the target movie into a computer; generating a database having a library of source movies; dividing the target movie into multiple tile regions; selecting source movies from the library; searching through the multiple tile regions to locate tile regions having a high visual similarity when compared with the selected source movies; positioning the source movies in the located regions; and repeating the search and positioning steps until the mosaic representation is complete.

In accordance with a further aspect of the invention there is provided a method of adaptively cropping a source movie for the purpose of inserting the source movie in a movie mosaic with an appearance that approximates a target movie, comprising the steps of: loading the source movie into a computer; rendering a tile region movie based on the target movie; selecting a first frame of the tile region movie and a first frame of the target movie; searching within the frame of the source movie to obtain a crop frame that yields a cropped source frame that best matches the frame of the tile region movie; repeating the search for further frames.

Further objects and advantages of the present invention will become apparent from a consideration of the drawings and ensuing description.

DESCRIPTION OF THE INVENTION

The present invention are now discussed in more detail. Within the context of the present invention the term "motion picture" (abbreviated "movie") is used as a general term for moving pictures, thus encompassing full length movies, home movies, video clips, animations and so on, whether generated, edited and stored digitally or through a photo process fully or in part.

In the following illustrations, film strips with perforated edges depict time-sections from a motion picture. Drawings of film strips better illustrate the sequence of frames that compose a motion picture. However, the present invention applies to other storage media of movies as well, such as analog magnetic storage and digital storage. In particular, digital storage and digital motion picture editing is preferred. Clearly, motion picture from any suitable medium (e.g. film, video, digital, compressed digital) can be transferred to the format that is best suitable for the processing in this invention. Furthermore, the resulting mosaic motion picture may be translated and stored on any suitable medium (e.g. film, video, digital, compressed digital).

Figure 1:
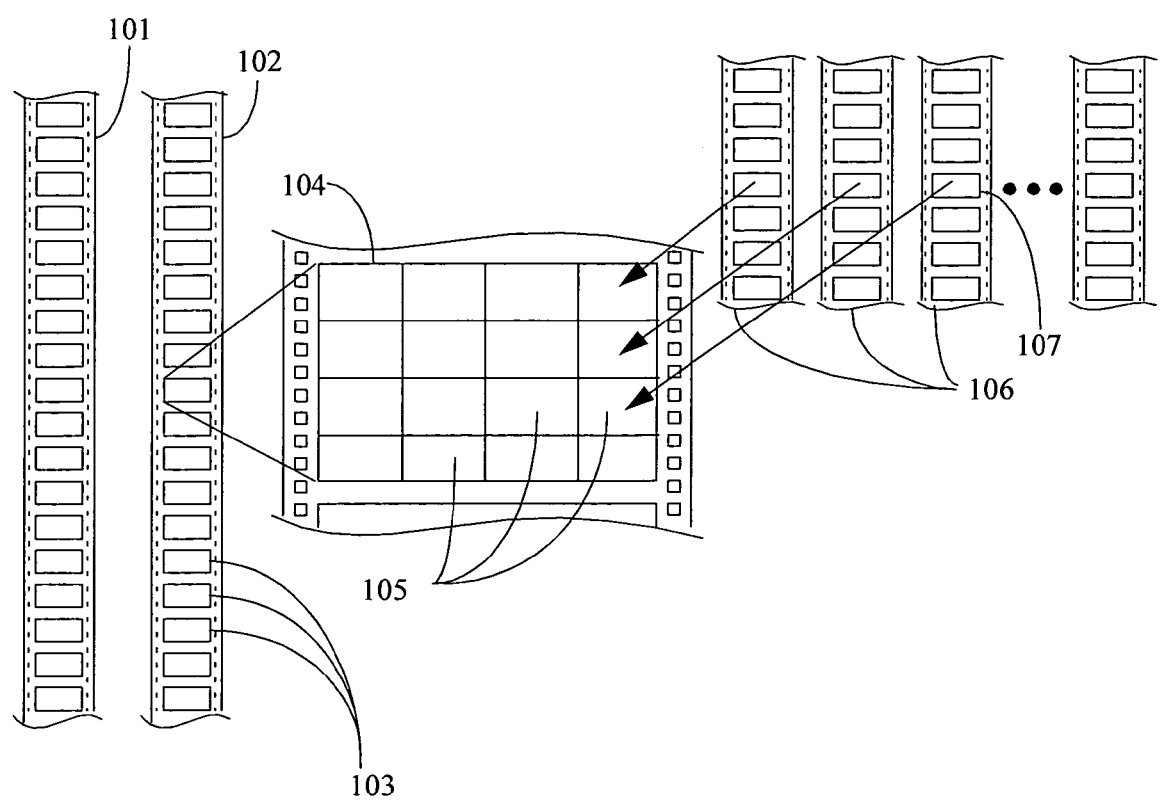
FIG. 1 describes the composition of a mosaic movie composed of tile region movies.

Referring to FIG. 1, a motion picture 101 is a target movie in the composition of a mosaic motion picture (a mosaic movie) 102. (Movie content is not shown, i.e. the frames are left blank in the illustration) Movie 102 is the mosaic movie resembling target movie 101, and it is composed of a sequence of frames 103. Movie frame 104 is an enlarged version of a sample frame of the mosaic movie. Sample frame 104 consists of tile frames 105. Each tile frame is a frame from a tile movie. Tile frame 107 is a sample frame from a sample tile movie of tile movies 106.

Thus, each movie frame of the mosaic movie consists of tile frames which are frames from tile movies. The sequence of movie frames of the mosaic movie is hence a tiled display of the sequence of frames of all the tile movies. For instance, one tile displays a tile movie of a dancer performing dance movements, another displays a movie of a tree moving in the wind, and another displays a movie of a ride at a fair, and so on. When viewed from a distance, the mosaic movie resembles a movie of the target movie, for instance the movie of a waving hand. The tile movies are chosen such that the colour, contrast and brightness changes of areas in the tile movies resemble the colour, contrast and brightness changes of corresponding areas in the tile region of the mosaic at which they are placed.

Generally, for the complete duration of the mosaic movie the tile frames remain of the same size. This means that each tile movie is of the same size and in the same location of the mosaic movie for the full duration of the mosaic movie. The length of the mosaic movie is mainly limited by the required amount of rendering and by the length of the available tile movies.

It is also possible to edit and concatenate movie sequences to lengthen the duration of the mosaic movie beyond the maximum duration of the shortest available tile movie. If, for instance a tile region in the target movie transitions from low brightness (dark) to high brightness (light), there are multiple choices to find tile movies to represent that region. One choice may be to find a source tile movie with a corresponding transition in its overall brightness. Another choice may be to create a new edited tile movie based on two source tile movies, the first one being a dark movie and the second being a light movie. Search techniques that assemble such transitions are reported in the prior art for a dynamic programming approach.

The generation of a movie mosaic consists of two phases: the search for tile movies to represent tile regions of the target movie, and the rendering of the mosaic movie based on the selected tile movies for each tile region.

In the prior art, as part of the search phase, the digital target movie and the tile source movies are decompressed if needed and the movies are analysed frame by frame. Some techniques in the prior art analyse the frame sequences by means of mathematical transforms (for instance wavelet transforms) and statistical properties about colour and brightness distribution (for instance colour histograms). Thus, if a movie is based on a typical 30 frames per second, for each second of the target or tile movies, 30 frames are analysed.

In the present invention the computational burden is significantly reduced by first applying temporal downsampling to the fame sequence. Temporal downsampling to a movie is a well known process in the general field of digital movie editing. In the present invention this process is applied as a step in the composition of a mosaic movie. This step is particularly effective if the motions and changes that occur in the source tile movies and in the tile region movies are slow of nature. If, for instance, brightness transitions (e.g. dark to light or vice versa) occur smoothly and spread over a duration of a few seconds, it suffices to base the mosaic composition on a temporal downsampled version of the movies based on a few frames per second (for instance 5 frames per second) as opposed to the original 30 frames per second. The degree of downsampling depends on the suitability of the underlying video material. In general slow varying material is preferred for a mosaic, and thus this step in reducing the computational complexity is then feasible and useful.

In preparation for the search phase, the target movie is decimated by selecting a subset of the movie's frames at regular intervals. As appreciated by someone skilled in the art, a movie segment of for instance 1000 frames can be reduced to 250 frames if only every 4th frame is considered. The important visual information in the movie is maintained, despite decimation, if the decimation factor is selected in an appropriate relation to the amount of change from frame to frame. As is well known in the art, if the imagery in the movie transitions gradually over great lengths of time, a higher decimation rate may be chosen than when the imagery transitions rapidly.

In addition to temporal decimation, it is beneficial to reduce the frame size as well by optionally applying an anti-aliasing filter and spatially sub-sampling each frame of the target movie from its original size to a smaller size. For instance if the digitized movie frames are 300 pixels vertically by 400 pixels horizontally, they can be sub-sampled to frames that are 30 by 40 pixels.

While temporal decimation and spacial sub-sampling are not necessary, they are preferred as they allow for a reduction in the amount of computing required during the search phase.

Figure 2:
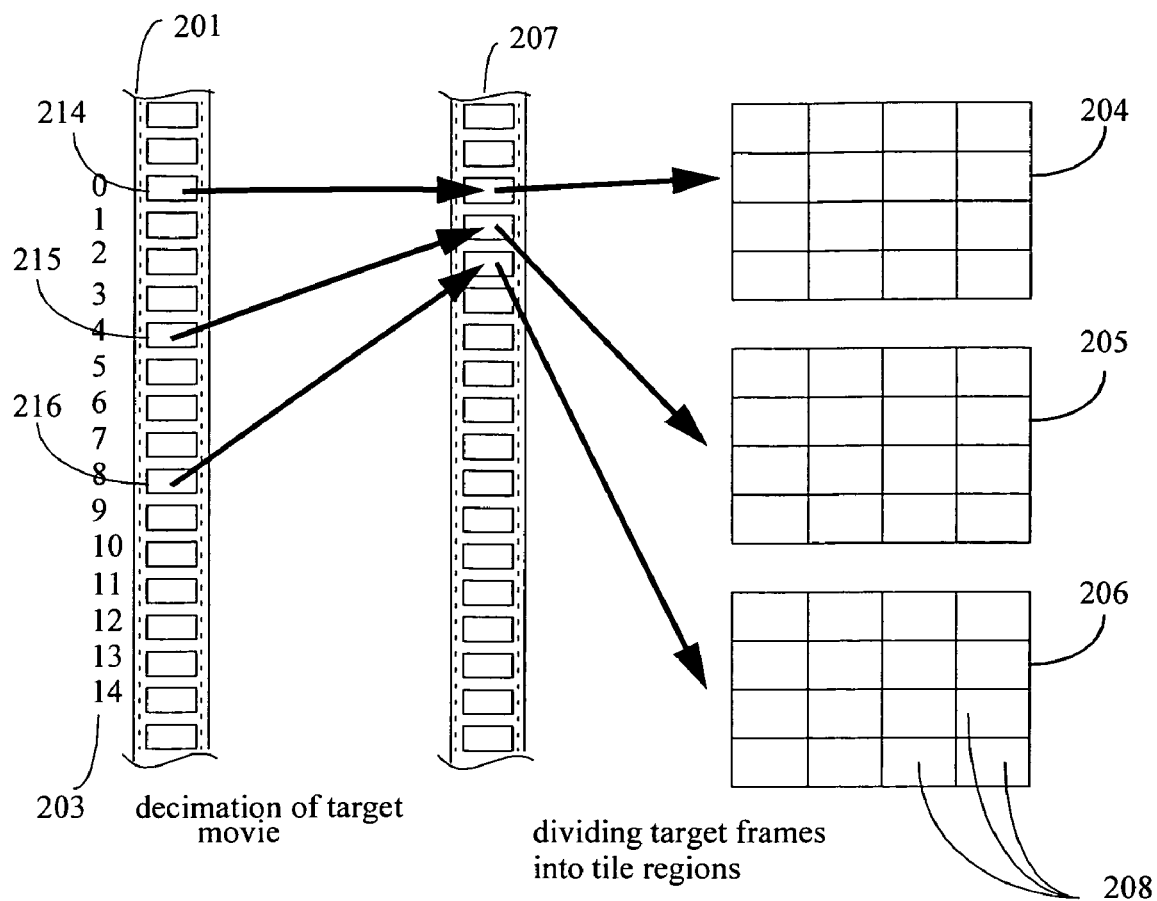
FIG. 2 describes the decimation of a target movie and the division of target frames into tile regions.

Referring to FIG. 2, target movie 201 is decimated in time to create a decimated target movie 207. Spatial sub-sampling may be performed as well, but this is not depicted. In this particular example sub-sampling is accomplished by assembling a new movie that consists of every 4th frame from the target movie. Example frames 214, 215 and 216 become subsequent frames in the decimated movie. Temporal aliasing filters may be applied in order to improve the purpose of downsampling. Furthermore, each frame is subdivided into a regular grid of tile regions 208. Frames 204, 205 and 206 are enlarged versions of 214, 215 and 216, and they show 16 tile regions for each frame. While the figure illustrates the case whereby there are 16 regions, in general the number of regions may be higher or lower, as long as there is more than one tile region.

Figure 3:
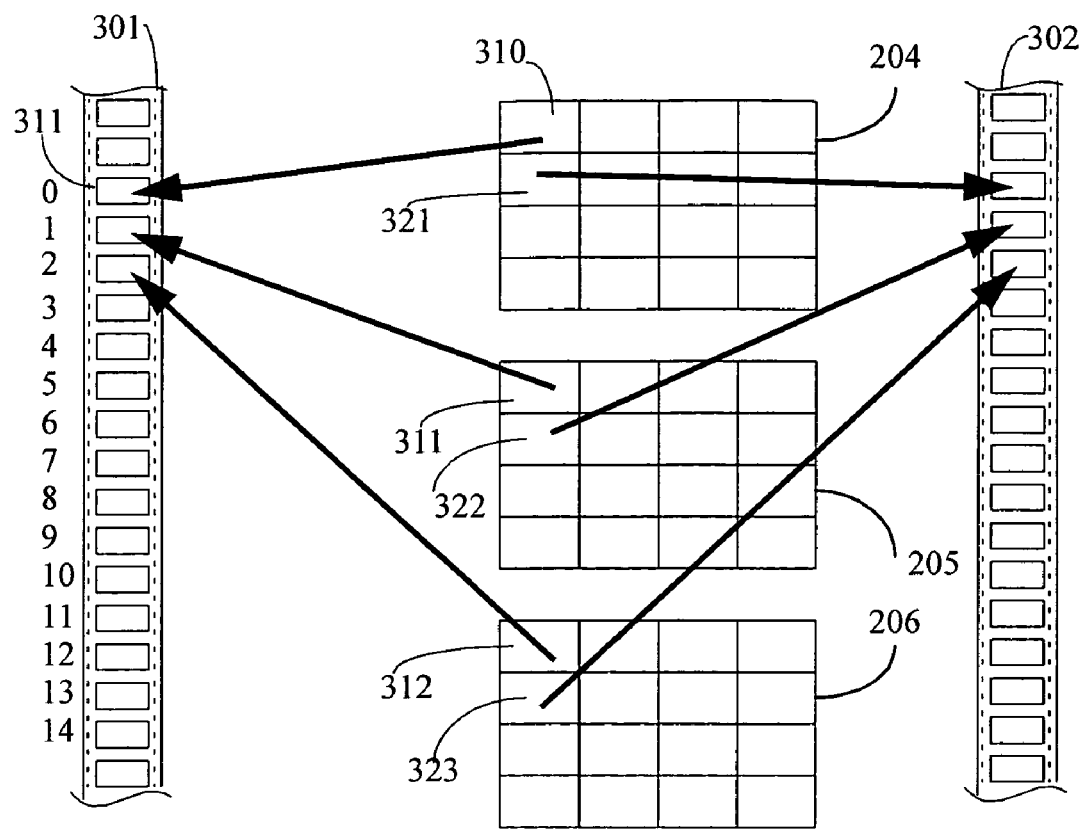
FIG. 3 describes the generation of target tile region movies.

For each tile region in the target movie, a target tile region movie is generated. Referring to FIG. 3, example tile region 310 of frame 204 becomes a frame 311 in a tile region movie 301. Similarly, tiles 311 and 312 from subsequent frames 205 and 206 become subsequent frames in tile region movie 301. A second example movie 302 is generated from a second sequence of tile regions: 321, 322 and 323. Clearly, each frame of target movie 207 produces 16 tile region movies. Each individual frame of a particular tile region movie is obtained from a corresponding tile region and frame of the decimated and sub-sampled target movie.

It should be clear that this step of creating tile region movies is not a necessary step in the creation of a mosaic motion picture. Frames from source tile movies may be compared directly to a particular tile region of a frame in the target movie, without first creating a tile region movie. Nevertheless, the description is based on the creation of tile region movies, as it is believed that this will benefit the understanding of the present invention.

Figure 4:
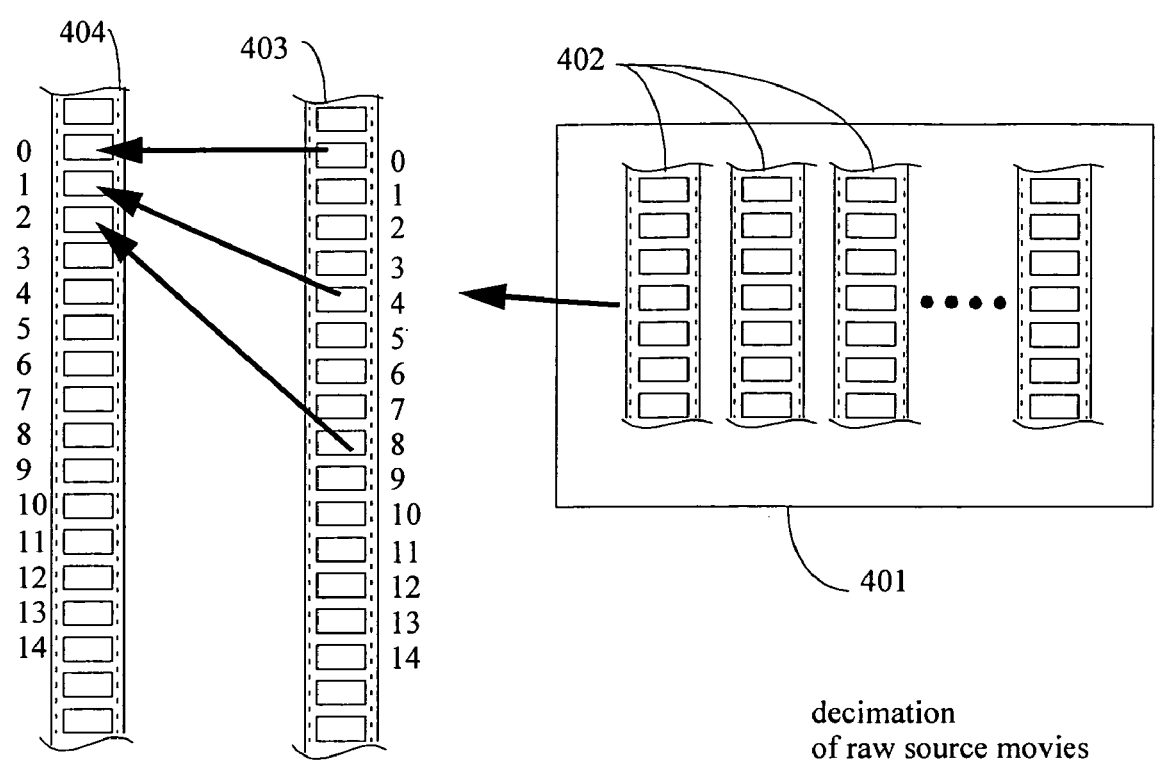
FIG. 4 describes the decimation of raw source movies.

The mosaic is generated by rendering a movie that is composed of the placement of suitable source movies at locations corresponding to the tile regions of the target movie. In preparation of finding a suitable source movie for a given tile region, each source movie in a data base of source movies is temporally decimated and spatially resampled in order to match the frame rate and pixel size of the tile region movies. Referring to FIG. 4, a data base 401 contains source movies 402. A sample movie 403 is decimated and resampled (resampling not depicted) to produce a decimated and resampled source movie 404.

To find the most suitable source movie to represent a particular tile region, the corresponding decimated and resampled tile region movie is compared to each decimated and resampled source movie to produce a figure of visual difference, and the source movie that produces the lowest figure of visual difference is then elected and placed at the corresponding tile location of the mosaic. This is repeated until all tile location are occupied with a suitable source movie.

In the preferred embodiment the most suitable tile region is found to represent a particular source movie. In this case, the corresponding decimated and resampled source movie is compared to each decimated and resampled tile region movie to produce a figure of visual difference, and the tile region at which the source movie is to be placed is elected by finding the tile region movie that produces the lowest figure of visual difference when compared to the source movie. This is repeated until all tile location are occupied with a suitable source movie. This method is explained in detail further below.

As appreciated by someone in the art, the tile movie frame and the source movie frame are represented by Red, Green and Blue (RGB) pixel values. In the preferred embodiment of the present invention, the figure of visual difference (disparity) is based on the pixel-by-pixel squared sum RGB difference between the tile source frame and the tile region frame under consideration. More precisely, if the RGB pixel values in the tile region frame under consideration are $R_i$, $G_i$ and $B_i$ (index $i=1 \ldots N$ covers all pixels in the rectangular or square tile region, and that region can be considered as an image itself), and if the RGB pixel values in the source frame under consideration are $r_i$, $g_i$ and $b_i$, (whereby the tile region and the tile image are of equal size) then a figure of difference based on the summed square with equal weighting of the three colour channels is $$e = \sum_{i=1\ldots N} ((R_i - r_i)^2 + (G_i - g_i)^2 + (B_i - b_i)^2)$$

In the case whereby the tile region frame and source frame are compared based on the grey values $V_i$ and $v_i$, a suitable figure of difference would be based on grey value difference:

$$e = \sum_{i=1\ldots N} (V_i - v_i)^2$$

In general, a smaller value of the figure of visual difference implies a better match between a tile region and a source tile image. The lower the figure, the more visually similar the two are and the more preferred an assignment of the image to the region is. Hence a high figure of visual difference implies a low measurement of visual similarity, and a low figure of visual difference implies a high measurement of visual similarity.

Colour RGB frames are easily transformed to a grey value frames, and this is useful if the tile movie matching is performed based on colour source movies but a black and white movie is used as the target movie. It is also well known that other digital colour representations, such as HSV (Hue Saturation and Value), or television broadcast formats such as NTSC and PAL may be translated to a digital pixel based RGB representation.

A person skilled in the art can now compose a software subroutine that calculates a figure of visual difference between two (cropped) images, whereby the two images may be two frames from the same movie or from two different movies.

It should be clear that spatial resampling may be required to ensure that the dimensions of the two images involved are equal, taking into account that either one or both may be cropped, so that a pixel by pixel RGB figure of visual difference may be calculated. The step of resampling may be omitted if the figure of visual difference is not based on a pixel by pixel comparison, but rather on a comparison of colour histograms, other image energy metrics, or image transforms.

Figure 5A:
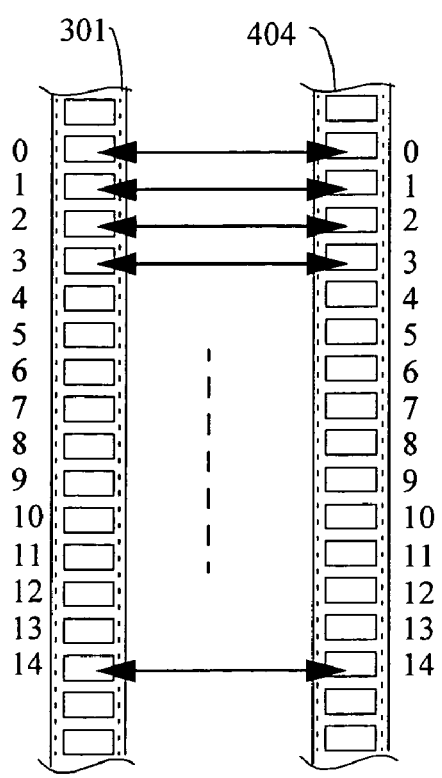
FIG. 5A illustrates a zero frame offset for calculation of the visual similarity.
Figure 5B:
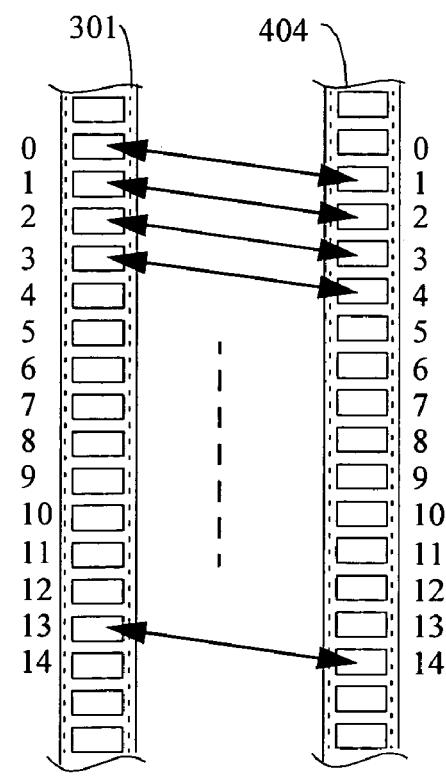
FIG. 5B illustrates a one frame offset for calculation of the visual similarity.

Referring to FIG. 5, frame number 0 of raw source movie 404 is compared with frame number 0 of tile region movie 301, and the figure of visual difference across all pixels of the frames is calculated and stored as the figure of visual difference for frame number 0. Then frame number 1 of raw source movie 404 is compared with frame number 1 of tile region movie 301, and the sum squared RGB error across all pixels of the frames is calculated and stored as the figure of visual difference for frame number 1. This is repeated until a figure of visual difference is computed for all frames over the specified duration. This duration is limited by the length of the source movies and the length of the target movie. Typical applications involve durations of a few seconds, but the present invention imposes no general duration limits. Of course, a further factor is the computational effort, and this effort increases with the length of the movies. The sum of all figures of visual difference is calculated to obtain a summed figure of visual difference that refers to the entire duration of the two movies (as opposed to just two particular frames).

A second summed figure of visual difference is calculated by delaying the frame alignment of the source movie with respect to the tile movie. Referring to the figure, frame number 0 of raw source movie 404 is compared to frame number 1 of tile region movie 301, and frame number 1 of raw source movie 404 is compared to frame number 2 of tile region movie 301, and so on until all frames are considered. Then, a second sum of all figures of visual difference is calculated to obtain a second summed figure of visual difference that refers to the entire duration of the two movies whereby the movies are delayed by one frame.

This is repeated for all possible and desired delays, and the delay that results in the lowest summed figure of visual difference is the preferred delay. In this delay matching step the best delay is found for a particular source-region pair, whereby a pair is defined by the combination of an individual tile region movie with an individual source tile movie.

In the preferred embodiment of the present invention, the optimum delay is found as follows:
1. Start with the first source tile movie from the library
2. Load the current source tile movie.
3. Start with the top left tile of the target movie.
4. Select the tile region movie that corresponds to the selected tile.
5. Start with zero delay.
6. Apply the delay to the source tile movie and calculate a figure of visual difference in relation to the selected tile region movie. Store this figure in association with the applied delay.
7. Repeat step 6 for all desired delays.
8. From among the figures of visual difference obtained from steps 6 and 7, find the figure with the lowest value, and designate the associated delay to be the optimum delay. Store this optimum delay in association with the applied tile (its location index) and the applied source movie (e.g. its file name or index into the library) in a summary matrix. Also store the figure with the lowest value in association with the applied tile (its location index) and the applied source movie (e.g. its file name or index into the library) in a summary matrix.
9. Repeat steps 4 to 8 for all tile regions
10. Repeat steps 2 to 9 for all source tile movies The result of the above steps is a summarising matrix, (or a table) of optimum delay values. The summary covers all source tile movies as rows of the matrix and all tile regions as columns of the matrix, such that the row and column index of an element in the matrix jointly designate the combination of a source tile movie and a tile region. The content at the index designates the optimum delay.

A further result of the above steps is a summarising matrix (a table) of figures of visual difference based on the application of the optimum delay. Similar to the summary above, the row and column index of an element in the matrix jointly designate the combination of a source tile movie and a tile region. The content at the index is the figure visual difference based on the application of the optimum delay. The summarising matrix shall be called a Disparity Matrix, since each element is a figure of visual difference, which is a measure of visual disparity.

A person skilled in the art can now compose a software subroutine that automatically finds the optimum delays for each source tile movie in a library, whereby an optimum delay is calculated in relation to an individual tile region movie.

The mosaic may now be composed as follows, based on the prior art method that finds the best source tile movie for a given tile region, and with inclusion of the delay matching method of the present invention:
1. Start with the first tile region of the mosaic
2. Locate in the disparity matrix the column that corresponds to the current tile region
3. Locate in that column the lowest figure of visual difference. The corresponding row number designates the best source tile movie for the current tile region.
4. Select that best source tile movie as the tile movie for insertion in the mosaic.
5. Locate in the matrix of optimum delays the optimum delay for the selected source tile movie for the current tile.
6. Insert the source tile movie in the mosaic at the location of the tile region, and apply the delay. Apply fixed or adaptive cropping to the source tile movie. Apply fixed or adaptive colour, brightness and contrast adjustments to the source tile movie.
7. Repeat steps 2 to 6 for all tile regions in the mosaic A person skilled in the art can now compose a software subroutine that automatically finds the best source tile movie for a given tile region. A method for adaptive cropping is described further below. A method for adaptive colour, brightness and contrast adjustments is also described further below.

It is well understood in the field of still image mosaics that sometimes a better visual effect is obtained by prohibiting neighbouring tiles in a still image mosaic from containing the same source tile image. This same restriction may be applied to a mosaic movie. This is easily attained by applying the restriction as part of step 6: once the best source tile movie has been selected it is checked whether in a neighbouring tile the same source tile movie has been selected with the same delay (the same source tile movie with a different delay may be considered acceptable). If this is the case, the best source tile movie is omitted and the second best source tile movie is applied. The second best, third best, and so forth are tried as necessary, until the restriction applied by the neighbouring tiles is satisfied.

The above steps describe a method to find the most suitable source movie to represent a particular tile region. The following example illustrates the relationship between the size of library and the size of the mosaic, as it relates to the above steps for creating a mosaic. When a source tile movie library contains for instance 5000 video clips, and when a mosaic shall be composed of 30 by 30 tiles (900 tiles in total), the above steps select from the 5000 video clips a subset of clips to be placed in the 900 tiles of the mosaic. Clearly, at most 900 video clips are selected, and depending on how many clips are selected for multiple tile locations, the number of selected video clips may be substantially less than 900.

In contrast to the search methods of the prior art, in the preferred embodiment the most suitable tile region is selected as the tile location for a particular source tile movie. This is accomplished as follows with random ordering of the sequence in which the source images are processed. A used/unused flag for each individual source tile movie aids in the selection ensuring that all source images occur at least once. The steps are as follows, based on finding the best tile region for a given source tile movie:
1. Reset (set to a value of zero) the selection flag for each individual source tile movie in the library
2. Randomly select a source tile movie from the library of source tile movies, and set (set to a value of one) its selection flag, thus marking that the selected source tile movie has been selected ("used") in the present iteration through the library. In this step, select only from the set of source tile movies that have their flag value at zero ("unused").
3. Locate in the disparity matrix the row that corresponds to the selected source tile movie
4. Locate in that column the lowest figure of visual difference from the figures of visual difference that correspond to available tile locations. The corresponding column number designates the best tile location for the current source tile movie.
5. Select that best location as the tile location for insertion of the current source tile movie in the mosaic. Mark that location such that it is no longer available for insertion.
6. Locate in the matrix of optimum delays the optimum delay for the current source tile movie and the selected tile location.
7. Insert the source tile movie in the mosaic at the location of the tile region, and apply the delay. Apply fixed or adaptive cropping to the source tile movie. Apply fixed or adaptive colour, brightness and contrast adjustments to the source tile movie.
8. Repeat steps 2 to 7 for all source tile movies in the library. Stop when all tile locations have been assigned a source tile movie.
9. Repeat steps 1 to 8 until all tile locations have been assigned a source tile movie.

A person skilled in the art can now compose a software subroutine that automatically finds the best tile region for a given source tile movie. The above method for placement of movies from a library in a mosaic is the preferred method for the present invention. Other methods may accomplish the same purpose.

A person skilled in the art can now compose a software subroutine that automatically places a substantial amount of movies from a library in a mosaic. A person skilled in the art can now compose a software subroutine that automatically places all movies from a library in a mosaic, as long as there are at least as many regions as there are movies.

The benefit of the present method for assigning tile movies to tile regions in the composition phase of the mosaic generation are now apparent. Not only is it possible to ensure the assignment of a substantial number of mandatory source movies to the mosaic, it is possible to generate multiple renditions of multiple raw source movies, and to place the rendition that best suits the tile region. A further benefit is that a more evenly distributed frequency of appearance of source movies may be accomplished, a distribution that closely approaches a uniform distribution. Whereas in prior art the over-usage of an individual tile movie may be controlled by limiting repeat occurrences of tile movies in the mosaic irrespective of the general suitability of the tile movie, the present method finds the best tile region for each individual source movie until all subject matters are depleted, and it repeats with replenished source movies until all tile regions are assigned.

The above steps describe a method to find the most suitable tile region as the insertion location for a particular source movie. The following example illustrates the relationship between the size of the library and the size of the mosaic, as it applies to the above steps for the preferred embodiment. When a source tile movie library contains for instance 350 video clips, and when a mosaic shall be composed of 30 by 30 tiles (900 tiles in total), the above steps find for each of the video clips in the library a suitable tile location. At the beginning of the first iteration through the library, a video clip is randomly selected from the 350 available video clips and a location for insertion in the mosaic is found for it. Then a second clip is selected from the remaining 349 clips, and from the remaining 899 tile locations a location for insertion in the mosaic is found for it. This is repeated until all video clips have been marked as inserted. The mark flag is then reset for all clips in preparation for a second iteration through the library. Thus, at commencement of the second iteration all 350 clips are available again, and there are 550 remaining tile locations (350 out of 900 tiles are occupied). After completion of the second iteration a subset of 700 tiles are occupied. During the third iteration the remaining 200 tiles are occupied with 200 out of the 350 video clips. Thus, following the example, all video clips occur in the mosaic at least twice, and some clips occur three times.

Of course, neighbouring restrictions (if applied) reduce the number of occurrences of a particular source tile movie. In the preferred embodiment it is an objective to ensure that all source tile movies occur at least once in the mosaic, and it is thus necessary that the neighbouring restriction be applied no sooner than after completion of the first iteration.

In the above steps for composing the mosaic the optimum crop adjustments and the optimum colour, brightness and contrast adjustments are determined after a source tile movie has been assigned to a tile region. In contrast, the optimum delay is determined before the assignment, and an individual optimum is found for each possible tile region to which a source tile movie may be assigned. It should be clear that the determination of an optimum before placement (pre-determination) is also possible for crop adjustments, and also for colour, brightness and contrast adjustments. The benefit of pre-determination is that the figure of visual difference that determines the best match between a source tile movie and a tile region movie is based on first applying a plurality of optimum adjustments. This may be better understood by considering the following two cases. In the first case adjustments are made after placement. Although the optimum adjustments improve the match, it is not possible to know whether a different source tile movie may improve the match even further when its optimum adjustments for that tile region are applied. That different source tile movie was rejected based on its resemblance without the presence of any adjustments, although adjustments could make it a better match than any other adjusted source tile movie. In a second case adjustments are made before selection. Since the selection is not known, adjustments must be made for all possible tile region placements of the source tile movie. Now an adjusted source tile movie may be selected knowing that no different source tile movie with adjustments applied to it could be a better match.

A drawback of pre-determination of adjustments is of course the required computational effort, since now a plurality of optima (as opposed to a single optimum, such as the optimum delay alone) must be determined for each possible tile region to which a source tile movie may be assigned, before it is known whether the assignment will be made or not. To reduce the computational effort it is of course possible to first rule out very poor matches and to thus limit the number of combination of source tile movies with tile region movies. For instance, if a particular dark source tile movie combined with a particular bright tile region movie provide a figure of visual difference that it very high in relation to all other figures of visual difference (e.g. the figure is in the top 20% of all figures), then there may be limited benefit in attempting to search for an optimum adjustment of cropping, colour, brightness or contrast. Or, as a different example, if a particular dark source tile movie is considered for a particular bright tile region, it suffices to omit the rendering of darkened version of the source tile movie, and it is beneficial to consider multiple techniques that render brightened versions of the source tile movie.

In the preferred embodiment of the present invention, delay is pre-determined, meaning that the figures of visual difference in the Disparity Matrix (as used for searching) are calculated with the optimum delay in place. In the preferred embodiment the brightness, contrast and cropping adjustments are post-determined, meaning that the figures of visual difference in the Disparity Matrix (as used for searching) are calculated without these adjustments in place. Thus, the disparity is based on neutral brightness, contrast, and colour adjustments, and the crop is from centre with the desired aspect ratio applied conform the aspect ratio of the tile region, and with an 80% coverage.

A further method to improve the resemblance of the mosaic with the target movie involves multiple croppings and time-varying cropping of the source tile movies. It is well understood that cropping of a movie generally changes the visual cinematographic composition of the movie, and thus the benefit to the composition of a mosaic is clear: cropping has the effect of changing the location of areas of a certain colour and brightness in relation to the view frame (the screen edges), which makes it a useful aid in modifying a source movie so that it may better match a designated tile region movie.

In the preferred embodiment, cropping is performed adaptively. This involves adjusting the cropping of a source movie one frame at a time such that the cropped source movie best resembles a tile region for which it is considered. The adjustment implies that for each frame of the source movie to which cropping is applied, a different crop window (a crop frame) is applied. This is accomplished by adjusting the size and location of the crop window. From movie frame to movie frame, as time progresses, the adjustment in the size and location of the crop window is small and incremental, so that the movement and size change of the crop window are gradual and smooth over time throughout the segment of interest of the source tile movie, thus avoiding unnecessary distractions for a person viewing tile regions of the mosaic movie.

In the prior art, adaptive cropping is a time-varying cropping technique used for image stabilization. The method for adaptive cropping in the present invention is different from the prior art. Moreover, in the present invention it is applied to the art of mosaic movies. The method in the present invention is best described by first describing the relevant prior art of image stabilization.

It is the objective of image stabilization to stabilize the content of a motion picture with respect to its view frame (the screen edges). The content may, for instance, be an aircraft which is video recorded against the sky. The videographer intends to maintain the aircraft in the centre of the view frame, as previewed in the viewfinder of the camera, and that is accomplished by tracking the motion of the aircraft through movement of the camera. However, a lack of accuracy in handling of the camera causes a mismatch between the camera movement and the position of the aircraft in the sky, which in turn causes the aircraft to appear to be wandering within the view frame as opposed to being firmly centered as time progresses.

As may be appreciated by someone skilled in the art of image stabilization, some methods for stabilization during video recording apply measurements from accelerometric sensors attached to the camera. In contrast, adaptive cropping intends to remove apparent instability of the camera by applying digital image processing after the video recording is complete, as a form of image post processing. Image instability is mostly due to unintentional shaking of the video camera or lack of handling accuracy in the tracking of a moving object.

Figure 6:
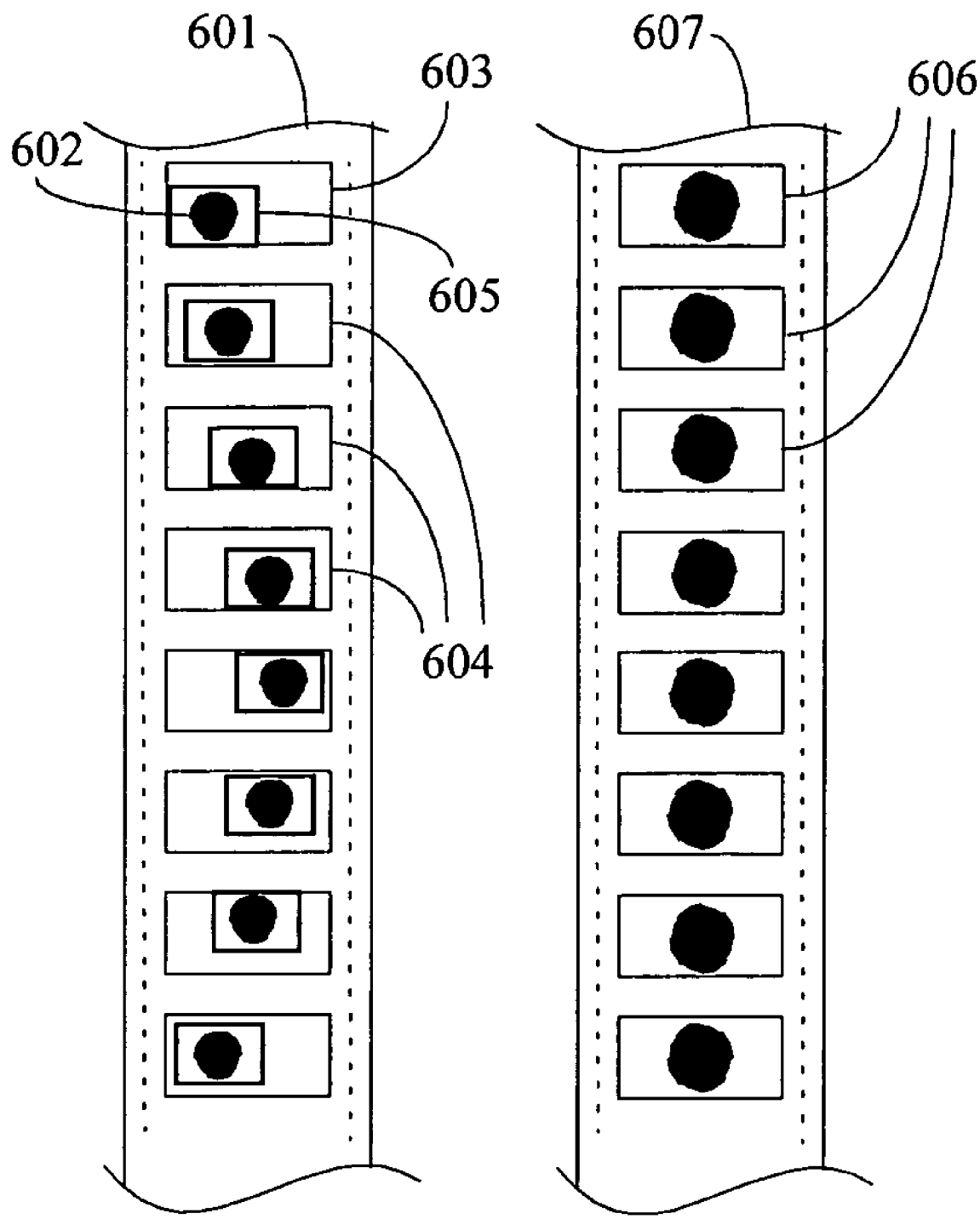
FIG. 6 illustrates crop tracking for image stabilization in prior art.

Referring to FIG. 6, a motion picture 601 contains unstable content, being the recording of an object 602. A dark object (a black disc) 602 is the main content and it is depicted against a light background. The wandering effect of an object due to an unstable image is illustrated by movement of object 602 relative to frame boundaries (the screen edges) of 601 throughout the depicted duration of the motion picture. An initial frame 603 is used as a reference frame for the initialization of the adaptive cropping process. An initial crop window 605 is applied such that the object of interest, object 602, is centered in it. Depicted are also frames 606 of a stabilized motion picture 607 that corresponds to motion picture 601. It is clear from the figure that the crop windows in frames of 601 follow the location of the object, ensuring it is always centered. In the resulting motion picture 607 the object appears stabilized and centered. The enlargement of the object is due to the size of the crop window in relation to the size of the frames in 601.

A further refinement compensates for the intentional change of content of the movie, which could be a result of objects that appear to move, or intentional zooming and panning. The refinement involves using a previous frame (for instance always the most recent frame preceding the current frame) as a reference for finding a crop window in the current movie frame. The reference movie frame for all croppings is then no longer a single initial movie frame.

It is well known that it is not necessary to detect and centre a particular object. As an alternative (not shown in the figure), the entire content of the initial frame is used as a reference, and an initial crop window is centered in the frame such that it covers a percentage (for instance 80%) of the initial frame. By ensuring that a percentage of the frame is covered by the crop window, and not the entire frame, it is now possible to move the crop window from frame to frame. It is the objective of adaptive cropping to overcome the apparent movement of the content that is due to camera shaking by making compensating movements of the crop window. This is accomplished by finding in each subsequent frame of the unstable movie a cropping of the content that most resembles the cropped content in the reference frame. This does not necessarily involve detecting a particular object.

As appreciated by those skilled in the art, one method to find the best location of the crop window involves Block Matching. Block Matching methods are based on the matching of blocks (rectangular areas) between two images (in particular, two subsequent frames of a motion picture), the aim being to minimize a disparity measure. This method is commonly used in the field of Motion Estimation in order to find displacement vectors, and it can be used for image stabilization as well. A minimum for the disparity measure is found by full-search block matching, which involves performing an exhaustive search of a series of discrete displacements within a maximum displacement range. In the case of finding a matching crop window this involves considering crop windows that are displaced within a maximum range (a search range) compared to a reference block. Image stabilization may be achieved with block matching and appropriate cropping of subsequent frames in order to minimize the disparity due to shaking, between a current frame and a reference frame. The reference frame may be an initial frame or it may be the previous frame.

A method for adaptive cropping is now presented for the present invention.

Figure 7:
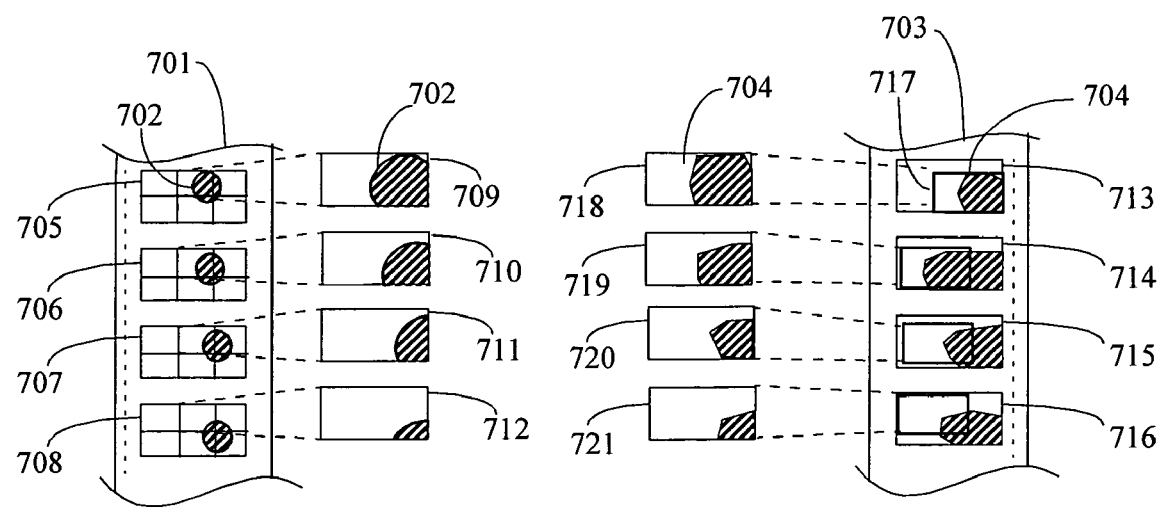
FIG. 7 illustrates crop tracking for improvement of visual similarity.

Referring to FIG. 7, a target movie 701 depicts the movement of a dark object 702 against a light background. For each of frames 705, 706, 707 and 708 of the target movie, tile region movie frames 709, 710, 711 and 712 are depicted. The movement of object 702 throughout frames 705, 706, 707 and 708 appears in frames 709, 710, 711 and 712 as a darker area that shrinks towards the bottom right corner of each frame. A source tile movie 703 depicts the movement of a dark object 704 throughout frames 713, 714, 715 and 716. A crop window 717 is located such that the content of cropped frame 718 best matches the content of tile region frame 709. The location of the crop window is determined by block matching. Crop window 717 is best aligned with the lower right corner of frame 713, which results in cropped frame 718, and that location of the crop window returns the optimum block match with target frame 709. In a subsequent frame 710 block matching is performed to find the best displacement of the crop window such that cropped frame 719 best matches tile region movie frame 710. This is accomplished by maintaining the crop frame size, and by considering discrete displacements of the crop window, using the location of crop window 717 as a starting point for frame 719. For each discrete displacement the content of the candidate crop window is compared to the content of tile region movie frame 710 and the displacement with the least amount of disparity is selected, thus arriving at a final location of the crop window for frame 714.

In the preferred embodiment of the present invention, adaptive cropping is applied as follows:
1. Set the crop window size (for instance 80% area coverage of the movie frame).
2. Set the maximum displacement of the crop window that is allowed from one decimated frame to the next decimated frame (for instance 20% of the frame size based on a temporal decimation to a frame rate of 2 frames per second).
3. Select a tile region movie and a source tile movie.
4. Determine the optimum delay for the source tile movie considering the selected tile region movie (using the summary matrix of delay values) and apply the delay to the source tile movie.
5. Start with the first frame of the tile region movie and the first frame of the source tile movie.
6. Find within the current frame of the source tile movie the optimum location of the crop window such that the figure of visual difference between the tile region frame and the cropped image area of the source tile frame is minimized. For the current frame, note the location of the crop frame by recording the location of the centre of the crop window.
7. Proceed to the next frame of the tile region movie and the next frame of the source tile movie.
8. Find within the current frame of the source tile movie and within the maximum frame to frame displacement of the crop window the new optimum location of the crop window such that the figure of visual difference between the current tile region frame and the current cropped image area of the source tile frame is minimized. For the current frame, note the new location of the crop frame by recording the location of the centre of the crop window.
9. Repeat steps 7 and 8 for the all frames of the mosaic movie.

It is now clear that the present invention is different from the prior art of image stabilization, in that the adaptive cropping for mosaic generation is applied to the source tile frame but its location is based on the current tile region frame and the cropped image area of the current source tile frame.

A person skilled in the art can now compose a software subroutine that adaptively crops a source tile movie in association with a particular tile region of the mosaic movie.

The maximum amount of displacement is best determined by assessing various settings. It should be large enough to allow the adaptive cropping to be effective in terms of finding a suitable new crop window location in order to minimize the block disparity between a frame of the target tile movie and a corresponding frame of the source movie. However, the maximum amount of displacement should be limited in order to limit the speed with which the crop window will move from frame to frame, thus limiting the possible shaking that may appear in the cropped source movie itself. Therefore, the setting of the maximum is a trade-off between the desired improvement of the resemblance of the mosaic movie to the target movie through adaptive cropping on the one hand, and on the other hand the stability of the cropped source movie as placed at a tile location. In the preferred embodiment the maximum is adjusted such that the crop frame can move half of its full width in no shorter time than one second. Readjustments of the maximum displacement are made depending on the judgement of the resulting mosaic by the user or artist producing the mosaic.

It should be clear that when adaptive cropping is based on temporally decimated frames (for instance one frame per second) then the crop window for all frames (for instance to attain cropping for a source movie at its original frame rate of 30 frames per second) may be obtained through linear interpolation. In other words, given that adaptive cropping finds crop window locations for frame numbers 0, 30, 60 and so on, (one frame per second decimated form 30 frames per second) then the crop window for frames 1 to 29 (30 frames per second) is calculated by smoothly transitioning the displacement of the crop window from its location in frame 0 to the its location in frame 30. The preferred method for a smooth transition involves linear interpolation of the crop window corner coordinates. Interpolation is performed over time, and it is applied to each coordinate (x and y) of each corner separately. This is then repeated for frames 31 to 59 based on the bracing frames 30 and 60, and so forth.

An alternate method for adaptive cropping involves finding an optimum crop window for the first frame, as above, and finding an optimum crop window for the last frame. Thus only two frames are involved in finding the optimum location for the crop window. Then, for all frames in between, linear interpolation is applied. This results in a lower computational burden, and it removes the possibility of apparent image instability due to a wandering crop window. The crop window now moves linearly over time and it moves only in one direction with a constant speed. Of course, in terms of matching the cropped source tile movie with the tile region movie, the result may be sub-optimal.

A further alternate involves finding an optimum crop window that is kept at a fixed location (constant coordinates over time) throughout the relevant duration of the source tile movie. The optimum location may be determined by calculating an individual figure of visual difference for each individual discrete and pre-selected location of the crop window, maintaining a fixed location throughout the relevant duration of the source tile movie. Pre-selection may be based on 80% coverage and several locations: horizontally and vertically centered, horizontally centered and vertically aligned with the top side of the frame, aligned with the top right corner of the frame, vertically aligned and horizontally centered with the left side of the frame, and so on (e.g. counter clock wise). Thus, for each source tile video an optimum fixed crop window is determined based on the intended or candidate tile location of the source tile video.

It is now clear how adaptive cropping can improve the resemblance of the mosaic movie with the target movie.

A further method to improve the resemblance of the mosaic with the target movie involves adjusting the colour, brightness and contrast of the source tile movies. It is well understood that such adjustments of a movie generally change the visual impression of the movie, and thus the benefit to the composition of a mosaic is clear: these adjustments are a useful aid in modifying a source movie so that it may better match a designated tile region movie.

In the preferred embodiment, adjustments of the colour, brightness and contrast are applied adaptively. This involves adjusting the colour, brightness and contrast of a source movie one frame at a time such that the cropped source movie best resembles a tile region for which it is considered.

In the preferred embodiment of the present invention, adaptive adjustments are applied as follows:
1. Set the maximum adjustment range for colour, brightness and contrast, (for instance a maximum of +20% and −20% adjustment).
2. Set the maximum adjustment change that is allowed from frame to frame (for instance an increment or decrement of 2% from one decimated frame to the next decimated frame, based on a temporal decimation to a frame rate of 2 frames per second).
3. Select a tile region movie and a source tile movie.
4. Apply the optimum delay and adaptive cropping to the source tile movie.
5. Start with the first frame of the tile region movie and the first frame of the source tile movie.
6. Adjust the colour, brightness and contrast of the source tile movie such that the figure of visual difference between the tile region frame and the cropped image area of the source tile frame is minimized. Note the values of the optimum adjustments for the current frame.
7. Proceed to the next frame of the tile region movie and the next frame of the source tile movie.
8. Adjust the colour, brightness and contrast of the source tile movie such that the figure of visual difference between the tile region frame and the cropped image area of the source tile frame is minimized, while restricting the adjustment values to not change more than the maximum adjustment change. Note the new values of the optimum adjustments.
9. Repeat steps 7 and 8 for all frames of the mosaic movie for the current frame.

A person skilled in the art can now compose a software subroutine that adaptively adjusts the colour, brightness and contrast of a source tile movie in association with a particular tile region of the mosaic movie.

The objective of applying digital image processing is to generate a plurality of renditions from a raw source image and to refine the resemblance once the tile region for a source image is known, thus improving the resemblance of the final mosaic that uses tile images from a raw source image library of limited size. It should be clear that the application of digital image processing to generate a plurality of renditions may apply to one or more raw source images in a library, that it may be applied selectively to some images and not all images, and that the library may be of any size.

It should be clear that digital image processing be applied, regardless of the type of search method applied, and regardless of the digital image processing. Thus, adaptive cropping and other image processing schemes applied to the source movies improve the resemblance of the mosaic, regardless whether the mosaic is based on a search method of the prior art, or whether it is based on a search method of the present invention.

It is understood that in photo or video editing typically contrast and brightness changes may be made to an image or movie with the intent to make the contrast and brightness of it more pleasing. However, in general, contrast and brightness adjustments may be made within a certain range while keeping the appearance of the image or movie satisfactory without the intent to make it pleasing. For instance, a movie may be slightly and noticeably darkened or lightened while the subject matter is still well lit and recognizable. Also, the contrast of a movie may be slightly reduced or increased while the visual details of the subject matter are still well distinguishable and recognizable. Methods for individually adjusting contrast and brightness are well known in the art.

It should be clear that digital image processing may be applied (whether before or after placement) regardless of the type of search method applied (present invention or prior art) to generate the mosaic. It should be clear that digital image processing in the present invention is different from blending (e.g. in prior art) the mosaic movie with the target movie by overlaying the mosaic with a transparent rendering of the target movie.

As is clear to someone skilled in the art, finding an optimum combination of colour (hue), brightness and contrast involves the application of a three parameter optimization method, and there are many very will known mathematical (numerical) methods that minimize a number based on the adjustment of multiple parameters. Moreover, methods exist to achieve the same under range limitations for the parameters. This applies to the above method in order to restrict the adjustment values to not change more than the maximum adjustment change.

It is now clear how adjustment of colour, brightness and contrast can improve the resemblance of the mosaic movie with the target movie.

A further method to improve the resemblance of the mosaic with the target movie involves the purposeful generation or recording of source tile movies based on tile region movies. A single movie or multiple movies are thus generated or recorded with the objective to obtain a source tile movie that resembles a particular selected tile region movie. It is clear that in general it may be beneficial for the creation of a mosaic to generate or record source movies based on knowledge about the tile region movies. The novelty in comparison to the prior art is now clear. In prior art a library of video clips is assembled without any knowledge of a particular target movie. It is well known that the library should contain multiple clips of varying brightness levels (dark clips, light clips), clips of various colours (light blue, green, etc.) and various transitions (dark to light, green to blue, etc.). Moreover, these requirements do not just apply to a spatial average across the screen, but they also apply to regions within the screen. In other words, in addition to all-screen colour and brightness requirements, there are also requirements for general areas of the screen (light blue on the right half, green on the left half) and transitions in general areas (dark to light in the bottom, green to blue in the top right corner). It is evident now why very large libraries are required in order to be able to find a suitable match, and it is evident why, despite the variety in a library, it may be impossible to find suitable source movies for certain tile regions with frequent transitions.

The present invention presents a method for generating a video clip library that is based on an individual target movie. For instance, when a tile region movie is visually dominated by a transition from dark red to bright yellow, a source tile movie is generated for that tile region, with the objective to contain a visually similar content by recording or editing such that a similar general colour transition results in a low figure of visual difference. The content of the source movie is generally different from the tile region movie, but the colour and brightness transitions in corresponding areas of both movies resemble each other.

Figure 8:
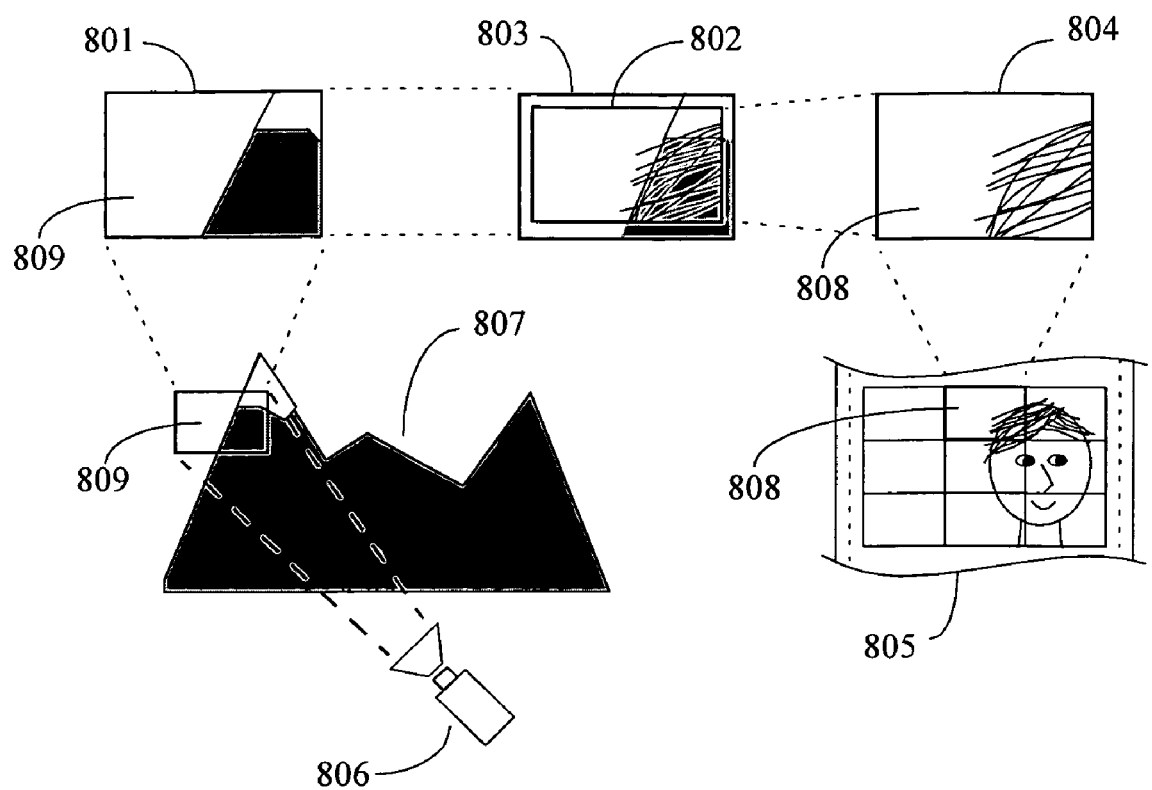
FIG. 8 illustrates the process for generating source movies for tile region movies.

The above method is further explained through the following example based on three video screens. The videographer views the three video screens with the objective to make a video recording that resembles a tile region movie that is played back (in a repetitive loop) in one of the monitors. A typical duration for the tile region movie would be 10 to 30 seconds, and the duration of the recording should substantially match the duration of the tile region movie. Referring to FIG. 8, the aforementioned three video screens are shown as a camera preview screen 801, an overlay screen 803, and a tile region screen 804 displaying a tile region movie 805. A section 809 of a mountain scenery 807 is captured by a camera 806 (in real time) and presented on camera preview window 801. In an overlay window 803 the camera preview from screen 801 is displayed. An 80% crop window 802 is displayed, and the tile region movie from screen 804 is overlaid inside 802. The overlay is performed with 50% opacity so that both the content from 801 and the content from 804 are visible on top of each other. Moreover, the overlay of 804 is performed with a size reduction to 80%.

The size reduction allows for a refinement of the match through an adaptive cropping post processing step (not shown in the figure). As described earlier, the resemblance between a source tile movie and a tile region movie can be improved through adaptive cropping.

In the preferred embodiment, a peripheral computer (not shown) loads the recording, then performs an optimum delay search, then applies adaptive cropping, then applies adaptive cropping and brightness, contrast and colour adjustment, and finally displays the resulting figure of visual difference on a computer screen. This figure is then used to evaluate whether the current recording is satisfactory for use as the designated source tile movie for the current tile region. When the evaluation is in favour of the recorded source tile movie, the tile movie is stored in a source tile movie library that is specific for the current tile region.

As an alternative, multiple recordings are stored in a source tile movie library that is specific for the current tile region, or for a group of tile regions (that have similar visual properties such as brightness, colour and transitions thereof), and the selection of the best source tile movie for an individual tile region from the group is performed in a separate step, once all recordings are complete. This sepataye step would entail the search of a suitable match between a source movie and a tile region, as described earlier for the mosaic generation.

It should be clear that the objective of the present invention is to produce a source tile movie that resembles a given tile region movie. The aforementioned example illustrates the preferred embodiment that accomplishes the task. Other methods without simultaneously viewing three screens are possible as well. An alternative method may involve viewing the tile region movie as a first step, then making a source tile movie recording as second step, and then calculating the figure of visual difference as a third step. These three steps in sequence are repeated by the videographer until the figure of visual difference is sufficiently low.

In the preferred embodiment source tile movies for a mosaic are produced as follows:
1. Start with the first tile region in the mosaic.
2. Obtain the tile region movie for the current tile region.
3. Present the tile region movie by playing it with cyclical repetition (a video loop) in a first video screen (e.g. a Television or a GUI screen on a computer).
4. Present the recording view of a video camera in a second video screen.
5. Present an overlay of both screens in a third video screen
6. Use the content of the overlay screen and the content from the camera screen to determine a suitable camera angle, camera movement, and camera zoom. As well, if possible, determine a suitable movement of the recorded objects and background (e.g. directed actor movements, directed special effects, directed background movements, choreographed dancers wearing costumes with specific colours).
7. With the suitable camera angle, camera movement, and camera zoom applied, and with suitable directed action occurring, perform a video recording by starting the recording time-synchronised with the beginning of the source tile movie and ending the recording time-synchronised with the end of the source tile movie.
8. Load the recording in the peripheral computer and apply a method that performs delay matching, adaptive cropping, brightness, contrast and colour adjustment, and that calculates the figure of visual difference.
9. Repeat steps 3 to 8 until the figure of visual difference reaches a satisfactory low value
10. Store the cropped, delayed and colour/contrast/brightness adjusted source tile recording as the designated source tile movie for the current tile
11. Repeat steps 1 to 9 until all tiles have been assigned a designated source tile movie Having completed the above recordings for all tile regions, the source tile movies may then be used to assemble the mosaic by placing them at their respective tile regions.

Of course, in stead of using the figure of visual difference as the criterion for determining the suitability of the current recording for the current tile, the criterion may be replaced by artistic judgement. If the artist assigned with producing the mosaic is satisfied with the current recording, it is deemed that the current recording be the assigned source tile movie for the current tile region.

Determining the maximum allowable value for the figure of visual difference requires some experimentation. In the preferred embodiment the maximum for the figure of visual difference is determined as follows:
1. For the mosaic at hand create source tile movies using the above steps for producing source tile movies. For each tile region use artistic judgement (instead of the figure of visual difference) to determine whether a recording is suitable for that tile region.
2. Render a sample mosaic by inserting each recording at the corresponding tile location, and present the mosaic movie for judgement on a screen.
3. Present a matrix of the figures of visual difference, whereby the row and column location of a figure in the matrix corresponds to the vertical and horizontal location of the corresponding tile region, such that the persons judging the mosaic may easily attain the figures of visual difference for any particular tile region by locating the tile and reading the figure from the matrix.
4. Determine which values figures of visual difference are acceptable by noting the values that are associated with tile regions that appear to result in a satisfactory match with the underlying mosaic.
5. Determine which values figures of visual difference are not acceptable by noting the values that are associated with tile regions that appear to result in a poor match with the underlying mosaic.
6. Repeat steps 1 to 5, with the following modification of step 1: the acceptable and unacceptable levels of figures of visual difference are now considered in the evaluation of the suitability of a source tile recording, in replacement or in addition to the artistic judgement.

Clearly, the target movie may be an (edited) recording or an animation, and all or any of the source tile movies may be an edited recording or an animation. Thus, an animation may be used as a target movie while all source tile movies are video recordings. Also, a video recording may be used as a target movie while all source tile movies are animations. In the latter case, animators may be assigned to create an animation that resembles a source tile movie that has been given to them as a guideline. As is the case with source tile movies, the content of each animated source movie (e.g. dancing red monsters, swimming yellow fish) may be entirely different from the content of the tile region movie (e.g. red and yellow flowers swaying in the wind), but it is the objective to achieve a close match in terms of the general colour and brightness transitions on the screen. The figure of visual difference may be used as a determinant whether the created animation meets the requirements for insertion in the mosaic at the respective tile location. Alternatively, artistic judgement may be used as a determinant.

Also, it may be more convenient for the videographer to consider tile regions out of sequence (e.g. group all dark tile regions and group all light regions, in stead of starting at the top right corner and working through the tile regions one column at a time). Also, for the purpose of convenience or artistic effect, it may be desirable to generate source tile movies for a subset of tile regions, and to find source tile movies for the remaining tile regions through a search in a video clip library as discussed earlier in the description for the present invention.

Figure 9A:
FIG. 9A illustrates a target movie for the generation of animated tile region movies.
Figure 9B:
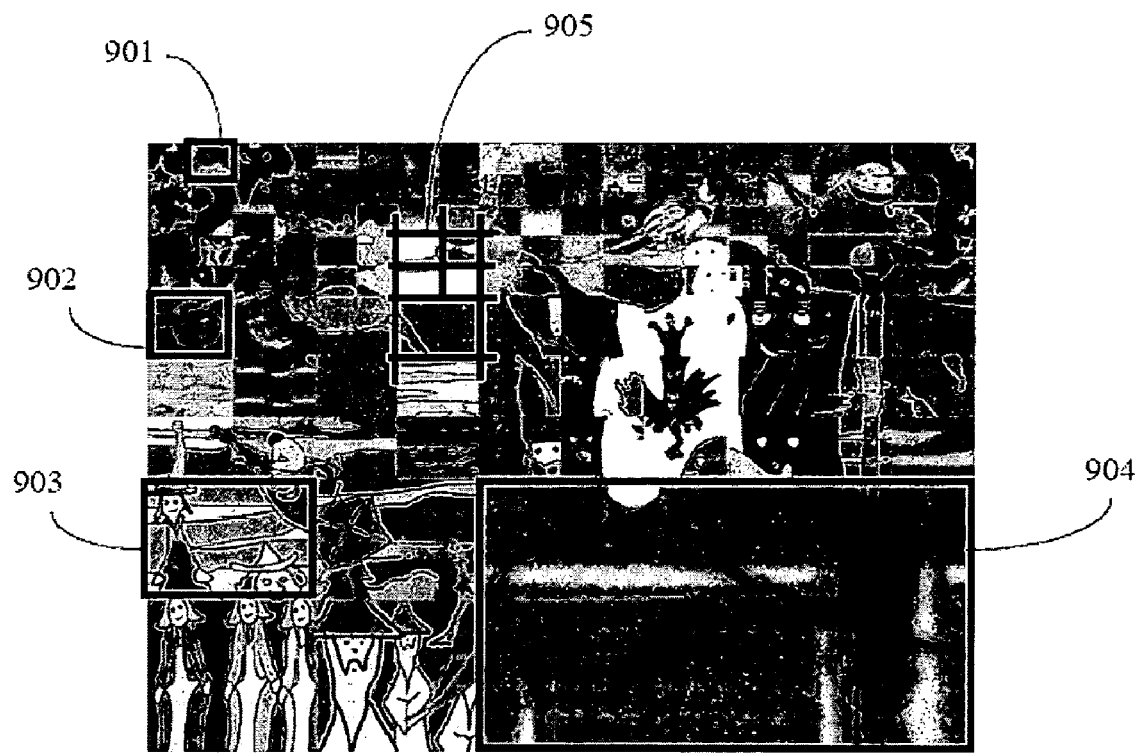
FIG. 9B illustrates a mosaic movie based on animated tile region movies.

The process of generating animated tile region movies based on a target movie may be better understood by the following example. FIG. 9A depicts a single frame from a target movie used in the creation of a mosaic movie. The target movie in this example is an animation of a flag waving in the wind, with some waving plant branches, against a lake as background. FIG. 9B depicts a resulting frame form the animated mosaic movie, based on animated tile movies. Sample tile regions 901, 902, and 903 have differing sizes. Region 904 is the corresponding corner of the target movie, inserted for illustration, in replacement of a source movie. Sample grid 905 highlights the boundaries of some further tile regions.

One skilled in the art can now apply the following example steps to create the animated sequence from which a mosaic movie may be created. A target animation video file is created by an artist through traditional frame-by-frame animation using a software package called ToonBoom Studio V2 by ToonBoom. This video file is then brought into Adobe Premiere from Adobe Systems and a grid is overlaid on the video, thus dividing it into small tiles. Using the image pan function to zoom into each of the tiles (as small as 36 by 27 pixels) the tiles are exported as a full sized (720 by 540 pixels) "targa" sequence for each tile region movie. The "targa" sequences are imported back into ToonBoom Studio V2 and a new animation sequence is created by the artist to mimic the movements and colours within the sequence. These source movies are then exported as source movies (SWF files). After all the individual source movies are created for all of the tiles, they are imported into Macromedia Flash MX and the movie mosaic is assembled using a grid that is equivalent to the tile region grid that is applied to the target animation in Adobe Premiere. With all the source movies assembled in their target location, a video file is exported ready for viewing.

A person skilled in the generation or recording of a source tile movie with a camera or through animation can now make a source movie such that it resembles a particular tile region movie, with the objective to use it in the generation of a mosaic. The above method is most effective when object motions and transitions are smooth and gradual (substantially slow motions) and when the duration of the mosaic is limited to under a minute. It should be clear, however, that the present invention applies to any duration, and that sudden and "flashy" transitions in a tile region movie may be effectively mimiced in a source tile movie.

Clearly, in a composition with hundreds of tile movies, an index is a useful aid to spot specific source movies quickly. The index could be used to locate video clips of or by specific people in the mosaic. The index is composed as follows in the preferred embodiment. Whenever for a particular tile region it is determined which source movie shall be placed at the corresponding location in the mosaic, the co-ordinates of the tile region are noted in association with the title of the source movie. The title would be a brief description of the subject matter of the source movie, or any other information of interest.

Thus, if the source movie depicts a person, the title of the source movie could be the name of the person. In order to compose the index list, the titles are listed in alphabetical order, and for each index entry (a title) in the index list, the region co-ordinates of each occurrence of that particular subject matter (as described by the title) are listed. This is similar to an index for a street map, whereby a single street name may apply to multiple box areas in a street map. The tile region co-ordinates in terms of an x- and y-index pair may be remapped to an alphanumeric and numeric pair as accustomed in maps and atlases.

It is also possible that more than one tile region is assigned a same alphanumeric and numeric pair. This would be the case if the mosaic is composed of for instance 30 by 30 tile regions, whereby the mapping co-ordinates are '1' to '5' horizontally and 'a' to 'e' vertically. A single map area (a box, such as 'a1', 'a5', 'b3' etc.) comprises of 6 by 6 tiles, totalling 36 tiles. Akin to a map, the co-ordinate labels '1' to '5' are then displayed (printed) from left to right across a border above the mosaic movie, and co-ordinate labels 'a' to 'e' are then displayed (printed) from top to bottom across a border left of the mosaic movie.

It should be clear that an index may be applied to a mosaic movie, regardless of the type of search method applied, and regardless of the digital image processing.

It should be clear that within the scope of the present invention other techniques may be applied to assign tile regions to source movies. These other techniques may include a pre-selection of tile regions based on the average colour or brightness of the tile regions, thus for instance limiting the search for a region to only regions that have the approximate average colour and brightness of a source movie. It should also be clear that the present invention is not limited to small libraries of source movies, and that for the present invention the number of source movies may exceed the number of tile movies.

It should also be clear that within the scope of the present invention assignments may be made individually or jointly with other source movies. It should also be clear that within the scope of the present invention assignments may be made for source movies, based on the subject matter of the source movies, based on the source movies itself, and/or based on a single or multiple rendition of the source movies. It should also be clear that within the scope of the present invention source movies may be obtained from motion pictures (video clips, home movies, other recordings), that a movie segment may be labelled with a subject matter, and that a suitable frame sequence may be selected based on a tile region movie, in which case in general a different best matching sequence is selected depending on the tile region for which the movie is considered.

In the preferred embodiment of the present invention, the final version of the mosaic is composed with the high resolution version of the selected tile movies, and the mosaic is digitally projected or otherwise displayed with high resolution so that sufficient details of the subject matter in the tile images are recognizable by the viewer.

It should be clear that within the scope of the present invention other materials may be used on which to display the mosaic, for instance textile, plastics, glass, and wall surfaces. It should be clear that within the scope of the present invention the mosaic may be displayed on a single computer monitor or video monitor, or an array of computer monitors or video monitors, or that it may be projected on one or several screens by means of one or several projectors, and that this may involve cathode ray tube technologies, liquid crystal display technologies, plasma display technologies or other optical display technologies, including projection technologies. It should be clear that within the scope of the present invention a translucent film (e.g. celluloid, other photo processes) may be produced for the purpose of projection viewing.

It should be clear that within the scope of the present invention several technologies may be used with which to store the mosaic, such as optical discs (e.g. Compact Disk technology, Digital Video Disc technology), magnetic discs (e.g. Hard Drive technology, Floppy Disc technology, Storage Tape technology) or other digital or analog technologies (e.g. film) suitable for the storage of movies.

Having described the preferred embodiment of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

I claim:

1. A method of generating a mosaic representation of a target movie, the mosaic representation incorporating a plurality of source movies, comprising the steps of:
    a) loading the target movie into a computer;
    b) generating a database having a library of source movies;
    c) dividing the target movie into multiple tile regions;
    d) selecting a source movie from the database;
    e) identifying available tile regions in the mosaic, said available tile regions being tile regions a1, which no source movie has been positioned;
    f) comparing the selected source movie with at least one of said available tile regions;
    g) selecting from said available tile regions a tile region which has high visual similarity to the selected source movie;
    h) positioning the selected source movie in the mosaic at the selected tile region;
    i) selecting the next source movie from the database;
    j) repeating steps e) to i) until the mosaic representation is complete.

2. The method according to claim 1 wherein a single source movie is selected from the library and wherein a single tile region is located having a highest visual similarity.

3. The method according to claim 1 wherein multiple source movies are selected from the library and wherein for each of the source movies a tile region is located having a high visual similarity.

4. The method according to claim 1 wherein the source movies are subjected to delay matching to increase the visual similarity.

5. The method according to claim 1 wherein the source movies are subjected to digital image processing to increase the visual similarity.

6. The method according to claim 5 wherein the digital image processing is applied after a region has been located for the source movie.

7. The method according to claim 5 wherein the digital image processing is applied before a region has been located for the source movie.

8. The method according to claim 5 wherein the digital image processing includes a cropping stage.

9. The method according to claim 5 wherein the digital image processing includes an adaptive cropping stage wherein the source movie is cropped based on the located region.

10. The method according to claim 5 wherein the digital image processing includes adjustment of brightness and/or contrast.

11. The method according to claim 5 wherein the digital image processing includes adjustment of colour.

12. The method according to claim 5 wherein parameter ranges of the digital imaging processing are determined individually for each source movie.

13. The method according to claim 5 wherein parameter ranges of the digital imaging processing are set jointly for multiple source movies.

14. The method according to claim 1, with the additional step of producing multiple versions of a source movie for use in generating a mosaic representation of a target movie, the mosaic representation incorporating a plurality of source movies by using the versions of the source movies, each of the versions being produced by applying one or more digital image processing schemes to the source movie.

15. The method according to claim 14 wherein generating the mosaic comprises of
  a) selecting a tile region of the target movie;
  b) comparing the multiple versions of the source movie with the tile region;
  c) searching through the multiple versions to select a candidate version having a high visual similarity with the tile region;
  d) using the selected version in replacement of the source movie in the mosaic movie representation.

16. The method according to claim 14 wherein the digital image processing schemes comprise of a cropping stage.

17. The method according to claim 14 wherein the digital image processing schemes comprise of an adjustment of brightness and/or contrast and/or color.

18. The method according to claim 14, wherein the digital image processing schemes are applied before a region has been located for the source movie.

19. The method according to claim 14, wherein the digital image processing schemes are applied after a region has been located for the source movie.

20. The method according to claim 1 with the additional step of generating a subject matter index for source movies used in a mosaic representation of a target movie, the source movies being positioned in tile regions of the mosaic representation based on visual similarity compared with corresponding regions of the target movie, the method comprising the steps of:
  a) assigning a co-ordinate to the location of each tile region;
  b) providing a title for the subject matter of each source movie; and
  c) preparing a list of co-ordinates for each title.

21. An article displaying a mosaic representation of a target movie, the mosaic representation incorporating a plurality of source movies, the mosaic representation composed by a process comprising the steps of:
  a) loading the target movie into a computer;
  b) generating a database having a library of source movies;
  c) dividing the target movie into multiple tile regions;
  d) selecting a source movie from the database;
  e) identifying available tile regions in the mosaic, said available tile regions being tile regions at which no source movie has been positioned;
  f) comparing the selected source movie with at least one of said available tile regions;
  g) selecting from said available tile regions a tile region which has high visual similarity to the selected source movie;
  h) positioning the selected source movie in the mosaic at the selected tile regions;
  i) selecting the next source movie from the database;
  j) repeating steps e) to i) until the mosaic representation is complete.

22. The article of claim 21 wherein the article includes optical display technology.

23. The article of claim 21 wherein the article includes movie storage technology.

24. A method for generating source movies for the purpose of inserting the source movies in a movie mosaic with an appearance that approximates a target movie, comprising the steps
  a) loading the target movie into a computer;
  b) dividing the target movie into multiple tile regions;
  c) selecting a tile region;
  d) generating a tile region movie based on the tile region;
  e) generating a new original source movie based on the tile region movie;
  f) generating from the source movie a tile movie for the tile region
  g) positioning the tile movie in the mosaic movie at a locus corresponding to the tile region.

25. The method of claim 24 wherein the new original source movie is generated with animation technology.

26. The method of claim 24 wherein the new original source movie is generated with directed action and/or directed camera angle and/or directed camera zoom.

27. A method of adaptively cropping a source movie for the purpose of inserting a cropped source movie in a movie mosaic with an appearance that approximates a target movie, whereby the cropping produces a version of the source movie that is visually more similar to a tile region movie of the target movie than the source movie,
comprising the steps of:
  a) loading the source movie into a computer;
  b) rendering the tile region movie based on a tile region of the target movie;
  c) selecting a first frame of the tile region movie and a first frame of the source movie;
  d) searching within the frame of the source movie to obtain a size and/or a location of a selected crop frame that yields a cropped source movie frame, said cropped source movie frame being more visually similar to the tile region movie frame than the source movie frame is visually similar to the tile region movie;
  e) applying said selected crop frame to said source movie frame, to obtain the cropped source movie frame
  f) repeating steps d) and e) for further frames until the version of the source movie is complete.

28. The method of claim 27 wherein a frame to frame displacement of the crop frame is limited to a maximum.

29. A method for generating a mosaic representation of a target movie, the mosaic representation incorporating a plurality of source movies, comprising the steps of:

a) loading the target movie into a computer;
b) generating a database having a library of source movies;
c) dividing the target movie into multiple generally complex tile regions;
d) selecting a tile region of the target movie;
e) selecting one or more source movies from the library;
f) for each of the one or more source movies, producing multiple versions of the source movie by applying one or mare digital image processing schemes to the source movie, each of the multiple versions being generally of a same size when compared to each other, and each of the multiple versions having a figure of visual difference when measured in comparison to the tile region movie said figure of visual difference for each version being substantially different from a figure of visual difference for other versions of said source movie g) for the selected tile region, selecting from the versions of the one or more source movies a version that has a high measurement of visual similarity to the tile region
h) positioning the version with the high measurement of visual similarity in the mosaic at the selected tile region
i) repeating steps d) to h) for all the tile regions.

30. The method according to claim 29 wherein the multiple versions are produced by a cropping stage in the digital image processing schemes.

31. The method according to claim 29 wherein the multiple versions are produced by adjustment of brightness and/or contrast and/or color in the digital image processing schemes.

32. The method according to claim 29, wherein the digital image processing schemes are applied before a region has been located for the source movie.

33. The method according to claim 29, wherein the digital image processing schemes are applied after a region has been located for the source movie.

* * * * *